(12) United States Patent
Corradin et al.

(10) Patent No.: US 10,811,881 B1
(45) Date of Patent: Oct. 20, 2020

(54) METHOD AND SYSTEM FOR REGULATING AN ELECTRICAL CONVERTER FOR AUTONOMOUS FREQUENCY STABILIZATION WITH LOAD TRANSIENTS IN A MICRO-NETWORK COMPRISING A DIESEL GENERATING SET

(71) Applicants: SOCOMEC, Benfeld (FR); UNIVERSITÀ DEGLI STUDI DI PADOVA, Padua (IT)

(72) Inventors: Michele Corradin, Costabissara (IT); Igino Toigo, Feltre (IT); Paolo Mattavelli, Padua (IT)

(73) Assignees: SOCOMEC, Benfeld (FR); UNIVERSITÀ DEGLI STUDI DI PADOVA, Padua (IT)

( * ) Notice: Subject to any disclaimer, the term of this patent is extended or adjusted under 35 U.S.C. 154(b) by 0 days.

(21) Appl. No.: 16/956,065

(22) PCT Filed: Dec. 20, 2018

(86) PCT No.: PCT/FR2018/053488
§ 371 (c)(1),
(2) Date: Jun. 19, 2020

(87) PCT Pub. No.: WO2019/122768
PCT Pub. Date: Jun. 27, 2019

(30) Foreign Application Priority Data

Dec. 21, 2017 (FR) ...................... 17 62881

(51) Int. Cl.
*H02J 3/38* (2006.01)
*H02J 3/46* (2006.01)
*H02J 13/00* (2006.01)

(52) U.S. Cl.
CPC ........ *H02J 3/381* (2013.01); *H02J 13/00002* (2020.01); *H02J 2300/10* (2020.01)

(58) Field of Classification Search
USPC .......................................... 307/43
See application file for complete search history.

(56) References Cited

U.S. PATENT DOCUMENTS

| 10,554,047 B2 | 2/2020 | Aubert Guyon et al. | |
| 2017/0117713 A1* | 4/2017 | Majumder | H02J 7/34 |
| 2017/0187188 A1 | 6/2017 | Aubert Guyon et al. | |

FOREIGN PATENT DOCUMENTS

| CN | 105743130 A | 7/2016 |
| CN | 107294201 A | 10/2017 |

(Continued)

OTHER PUBLICATIONS

Search Report from corresponding FR Application No. FR1762881, dated Oct. 10, 2018.

(Continued)

*Primary Examiner* — Rexford N Barnie
*Assistant Examiner* — Xuan Ly
(74) *Attorney, Agent, or Firm* — Workman Nydegger (57) ABSTRACT

A method for regulating a converter to autonomously stabilize the frequency of a microgrid comprising a generating set, the method comprising: a determination of a power regulation variable from a power variation resulting from the initial power setpoint from which the estimated active power and the active damping value have been subtracted, a calculation of a second power variation at least from the difference between the power regulation variable and the estimated active power, and a determination of a frequency command value for commanding the converter from the second power variation, a reception of a frequency value characteristic of a load variation of said microgrid to which the converter is intended to be connected, and a determination of an active damping value from the received frequency value.

6 Claims, 4 Drawing Sheets

(56) References Cited

FOREIGN PATENT DOCUMENTS

| EP | 2731223 | A1 | 5/2014 |
|----|---------|----|--------|
| EP | 3185386 | A1 | 6/2017 |
| WO | 2016133843 | A1 | 8/2016 |

OTHER PUBLICATIONS

International Search Report and Written Opinion from PCT Application No. PCT/FR2018/053488, dated Mar. 11, 2019.

* cited by examiner

METHOD AND SYSTEM FOR REGULATING AN ELECTRICAL CONVERTER FOR AUTONOMOUS FREQUENCY STABILIZATION WITH LOAD TRANSIENTS IN A MICRO-NETWORK COMPRISING A DIESEL GENERATING SET

BACKGROUND OF THE INVENTION

The invention relates to a system and method for stabilizing the frequency in a microgrid comprising a generating set.

The invention is applicable to microgrids or similar electrical installations in which a power converter, called "power converter system" (PCS) and normally using a battery such as an energy reservoir, works in parallel with a generating set forming an electrical production unit. The electrical production unit, that is to say the generating set, power supplies electrical loads and manages the distribution of electrical energy according to the difference between the electricity demands of the loads and the produced amount of electricity.

A microgrid is a localized grouping of electricity sources and loads which operates normally connected and synchronous with the conventional centralized electrical network, also called "macrogrid", but which can be disconnected and operate autonomously according to physical and/or economic conditions. A microgrid thus provides a good solution for supplying energy in an emergency situation by having the possibility of switching from an independent operating mode, or "islanded mode", to a mode connected to the main network. However, control and protection are important issues in this type of network configuration.

A diesel generating set is a particular generating set consisting in combining a diesel motor with an electric generator, often an alternator, to generate electrical energy. The combination of a diesel motor, a generator and various auxiliary devices, such as devices for the base, awning, sound attenuation, command systems, circuit breakers, water heaters, preheating systems and the starting system is called "generating set" or "genset".

In order to ensure the autonomous operation of the microgrid and to generate less transient operation, the PCS and the generating set of a microgrid must both operate as voltage generators.

Specific techniques must be used to ensure the proper operation of two or more voltage generators operating in parallel.

When a PCS operates in parallel with a generating set, both operating as voltage generators, the interaction between the two control systems can sometimes cause instability of the voltage and frequency of the microgrid mainly during the load transient.

Indeed, the generating set has a frequency controller and a voltage controller. It also has relevant inertia and high equivalent impedance. The PCS also has voltage and frequency controllers, and these controllers can interact with those of the generating set when the generating set and the PCS operate together as voltage generators in the microgrid. Particularly, by trying to follow the variations in frequency and voltage, the PCS will reduce or increase the load of the generating set which, upon seeing a load variation, will dynamically change the frequency of the generated electrical signal which may cause instability.

During steady-state operation, the PCS must inject constant power in order to set the operating point of the generating set and ensure optimized fuel consumption for the generating set. Appropriate quick control must be implemented in the converter in order to have a stable operation in a stable state.

As the PCS must operate at constant power, any variation in load is normally sensed by the generating set. This causes a significant transient in the frequency and the voltage of the microgrid, even significantly disturbing the microgrid and the operating point of the generating set.

It is therefore important to stabilize the operating point of the generating set, both in steady state and during the load transient.

Generally, a microgrid comprising a generating set and at least one PCS is managed with an energy management system (EMS), using two possible aggregations.

In a first aggregation, the generating set controls the voltage and the isochronous operating frequency. The PCS is managed by an EMS as a current generator in order to optimize diesel consumption. The generating set must always be operational. The dimensioning of the system in terms of power P is normally:

$$P_{Genset} > P_{load} > P_{renewable} > P_{PCS}$$

$P_{Genset}$ being the maximum power supplied from the generating set, $P_{load}$ the maximum power required by the load, $P_{renewable}$ the maximum power supplied by renewable energy sources, and $P_{PCS}$ the maximum power delivered by the PCS.

However, in this first aggregation, the microgrid is turned off when the generating set is switched off, because the PCS does not have the capacity to support the load and to stabilize the voltage and the frequency.

In a second aggregation, the generating set and the PCS operate in parallel as voltage generators. The generating set operates isochronously and can be deactivated. The PCS is commanded by the EMS system when the generating set is activated and is isochronous when the generating set is switched off. The dimensioning of the system in terms of power P is normally:

$$P_{PCS} \sim P_{Genset} > P_{load}$$

In this second aggregation, by excluding stability problems when they are not properly managed, the microgrid could continue to be power supplied even if the generating set were to be switched off.

Unfortunately, in parallel operation, each load transient or variation of renewable energy will cause a voltage and frequency transient and a different operating point for the generating set.

Considering a case with renewable energy sources acting as current generators, only the power or limitation thresholds are normally applied and nothing is considered to manage the fast transients or to stabilize the frequency and the voltage.

Thus, when the generating set operates isochronously, the PCS is controlled by the EMS system in order to optimize diesel consumption. However, any load variation will cause a frequency and voltage transient in the microgrid, due to the time response of the generating set control.

In addition, an instability could appear due to the interaction between the generating set and the PCS having the load transient as a trigger.

A known solution which attempts to use the EMS system to adapt the nominal PCS power during load transients, has intrinsic delays due to the time required to, firstly, measure the active power (which is not usually measured by the EMS but by an additional external peripheral device), secondly, calculate a new nominal power for the converter and, thirdly, transmit it to the converter itself (if there is more than one converter, this delay increases significantly).

These delays not only reduce the efficiency of this solution in frequency stabilization and in consumption of the group but can also affect the stability of the system because if the action of the converter is too delayed compared to the frequency variation event, an oscillatory behavior can be triggered.

Known systems fail to have a stable operating point for the generating set during the load transient, which unfortunately leads to a significant variation in frequency and voltage in the microgrid.

In order to synchronize and put in parallel two or more different voltage sources, a typical solution consists in using a voltage/frequency drop control, also called "droop control".

Figure 1:
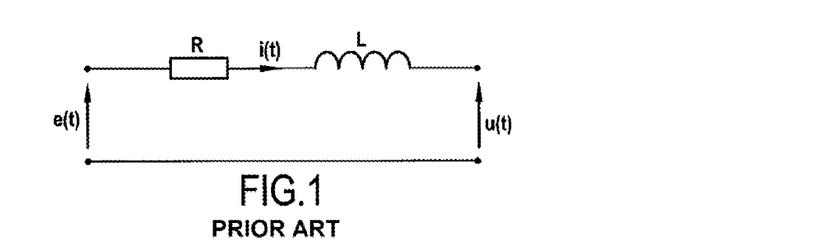
FIG. 1, already described, schematically shows the electrical coupling of two voltage sources according to the prior art.

FIG. 1 is a simple schematic representation of two voltage source connections. As shown in FIG. 1, the connection is represented by two ideal sources e(t) and u(t) and an inductive impedance therebetween with a resistance component R and an impedance component L.

To explain the theory of drop control, by considering a sine wave, a phaser, that is to say a complex representation, can be used to describe the voltages, e(t) and u(t), and the current i(t) of the cable of FIG. 1.

$$I = \frac{E - U}{Z}$$

where I, E and U indicate the phasor of the respective current or voltage and Z is the complex impedance of the electrical line. By writing the complex quantities with the absolute value and the phase representation, we have:

$$E = Ee^{-j\varphi_e}$$
$$U = Ue^{-j\varphi_u}$$
$$Z = R + j\omega L = Ze^{-j\theta}$$

The complex power S which circulates at the beginning of the line is equal to:

$$S = p + jq = \frac{1}{2} E \cdot I^* = \frac{1}{2} E e^{j\varphi_e} \frac{E e^{-j\varphi_e} - U e^{-j\varphi_u}}{Z e^{-j\theta}} = \frac{E^2}{2Z} e^{j\theta} - \frac{E \cdot U}{2Z} e^{j(\varphi+\theta)}$$

where $\varphi = \varphi_e - \varphi_u$, that is to say where $\varphi$ corresponds to the phase difference between the two voltage sources, and where the operator * represents the conjugation of the complex number.

The real and imaginary parts of S are written as follows:

$$P = \text{Re}(S) = \frac{E^2}{2Z} \cos(\theta) - \frac{E \cdot U}{2Z} \cos(\varphi + \theta)$$
$$Q = \text{Im}(S) = \frac{E^2}{2Z} \sin(\theta) - \frac{E \cdot U}{2Z} \sin(\varphi + \theta)$$

In the case of a purely inductive line, we have $$\theta = \frac{\pi}{2},$$

and therefore:

$$P = \text{Re}(S) = \frac{E \cdot U}{2Z} \sin(\varphi)$$
$$Q = \text{Im}(S) = \frac{E^2}{2Z} - \frac{E \cdot U}{2Z} \cos(\varphi)$$

And if the phase difference $\varphi$ between the two voltage sources is small, then $\sin(\varphi) \approx \varphi$ and $\cos(\varphi) \approx 1$ which leads to having:

$$P = \text{Re}(S) = \frac{E \cdot U}{2Z} \varphi$$
$$Q = \text{Im}(S) = \frac{E}{2Z} \Delta E$$

where $\Delta E = E - U$.

From the above equations, it is clear that in the case of an inductive line and a small difference between the phases of the two voltage sources, the exchanged active power P depends mainly on the phase difference $\varphi$, while the reactive power Q depends mainly on the voltage amplitude difference $\Delta E$.

On the basis of the above equations, it is possible to define a local wireless control strategy, generally called droop control where the following equations, hereinafter called drop control equations, apply to each voltage source:

$$f = f_0 - k_f P_m$$
$$V = V_0 - k_V Q_m$$

where $P_m$ and $Q_m$ are respectively the active power and the reactive power measured by one of the voltage sources, $f_0$ and $V_0$ are respectively frequency and voltage setpoints, and $k_f$ and $k_V$ are control coefficients, called "droop coefficients".

If, for example according to FIG. 1, there is an active output power, $\Delta P$, circulating from the source E to the source U, this means that $\varphi_u > \varphi_e$.

Based on the droop control equations, source E begins to decrease the output frequency by a value given by $k_f \Delta P$, while source U, seeing an opposite power, $-\Delta P$, increases its frequency by the same amount. In this way, $\varphi_e$ increases while $\varphi_u$ decreases until the phases $\varphi_e$ and $\varphi_u$ of the two voltage sources e(t) and u(t) match.

Figure 2:
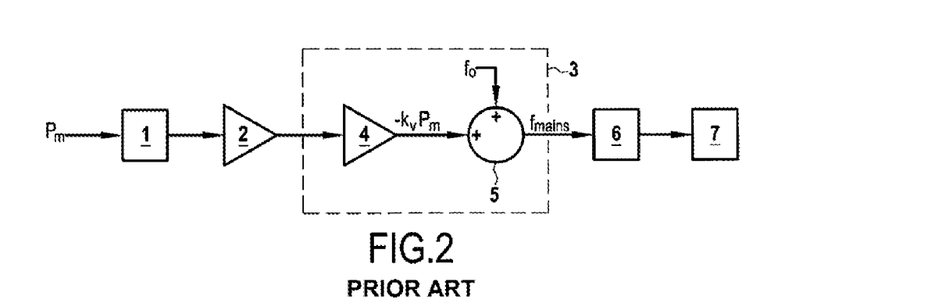
FIG. 2, already described, schematically illustrates a standard droop loop according to the state of the art.

FIG. 2 schematically illustrates a standard frequency drop regulation loop, called "Basic Droop", which achieves a conventional negative linear characteristic of the frequency f depending on the active power $P_m$.

When this technique is used to put a converter, such as a PCS for example, in parallel with the main network, such as a generating set for example, the main network has a constant voltage amplitude and a constant frequency which do not depend on the load and on the active and/or reactive power supplied.

Under these conditions, the basic droop equations alone allow putting two or more sources in parallel but do not allow controlling the power exchanged between the converter and the mains, the converter being a PCS and the mains corresponding to a generating set for example. This is because the power exchanged with the mains is defined by the droop equations as a function of the difference between the mains frequency $f_{mains}$ and the mains voltage $V_{mains}$ and the internal setpoints of the converter, the PCS, $f_0$ and $V_0$. Indeed, if the frequency of the main network, that is to say the frequency of the mains $f_{mains}$, is, for example, not exactly equal to the nominal frequency of the converter $f_0$, the converter must exchange an active power $P_m$ for the following droop equation to be verified:

$$f_{mains} = f_0 - k_f P_m$$

To explain the representation of FIG. 2, the three-phase active power $P_m$ measured by one of the voltage sources is supplied to a low-pass filter 1 which extracts the average value of active power by suppressing the terms of power oscillations at 50, 100, 150 Hz. The output of the low-pass filter 1 is processed by the operator 2 which supplies the opposite of the output of the low-pass filter 1, that is to say the negative of the output of the low-pass filter 1. The value supplied by the negative operator 2 is then sent to a standard frequency drop regulation loop 3, that is to say a "basic droop", and particularly to an operation module 4 of the standard regulation loop 3 which determines a corresponding frequency value by multiplying a coefficient $k_v$ by the negative filtered active power $P_m$. The determined frequency $-k_v P_m$ is then transmitted to an adder 5 of the regulation loop 3 configured to supply a frequency value $f_{mains}$ resulting from the addition of the determined frequency $-k_v P_m$ supplied by the operating module 4 with a nominal frequency $f_0$. The adder 5 supplies the resulting frequency value $f_{mains}$ to an integrator 6 which determines the reference angle of the sinusoidal voltage PCS, θ, from the expression of the sinusoidal voltage which is expressed according to the equation $V = V_{ampl} * \sin(\theta)$ with $V_{ampl}$ corresponding to the voltage amplitude.

Figure 3:
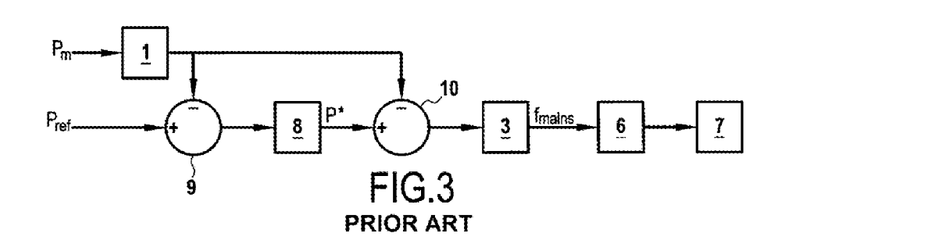
FIG. 3, already described, schematically shows a standard droop loop with an external regulation loop according to the state of the art.

To keep the wireless characteristic of the regulation loop but add the control of the exchanged output power, an external regulator block is added as illustrated in FIG. 3 which schematically shows a standard frequency drop regulation loop 3 with an external loop 8 which oscillates the droop characteristic P(f) to follow the required power.

The filtered active measured power $P_m$ is subtracted from an initial power setpoint by the first comparator 9 which supplies the result of the difference to the external regulator block 8. The external regulator block 8 determines a power variable P* and supplies it to a second comparator 10. The second comparator 10 calculates the differences between the power variable P* and the filtered active measured power $P_m$. The result of the difference calculated by the second comparator 10 is then sent to the standard regulation loop 3, or "basic droop", which determines the frequency value as explained with reference to FIG. 2 and delivers it to an integrator 6 which determines the reference angle θ of the sinusoidal voltage of the inverter.

The external regulator block 8 introduces new variables into the droop control equations, P* and Q*:

$$f = f_0 - k_f (P^* - P_m)$$
$$V = V_0 - k_v (Q^* - Q_m)$$

Adding the variables P* and Q* amounts to displacing the frequency/voltage setpoint in order to provide different power at the same output frequency/voltage. The integral gain of the external regulator 8 slowly displaces the characteristic called droop characteristic while trying to match the requested power.

The basic droop control solution allows wirelessly putting a voltage source converter in parallel with another voltage source, such as for example the mains or a generating set, while the external regulator adds a slow control of the exchanged power.

As in any control solution of this type, the internal loop must be much faster than the external loop. Thus, in the case for example of a variation of output frequency, the drop regulation loop 3 will react first in order to follow the frequency variation forcing a power exchange to match the new frequency, then the external regulation loop 8 will slowly integrate the difference between the requested power and the measured power in order to compensate and restore the desired power.

As explained, the output frequency of the converter substantially corresponds to the output frequency that can be measured and the value of the expression $k_f(P^*-P_m)$ can be considered as a measurement of the variation in output frequency Δf of the nominal value $f_0$. It is clear that this measurement is delayed because, as explained previously, in the event of variation in output frequency, the phase difference of the sources begins to change, and therefore a power is exchanged (this exchanged power is seen by the converter via a filtering action). The droop equations are applied to reduce the power exchanged and keep it under control.

In the case of a source of rapid frequency variation, which can happen with a generator that can reach frequency variations of the order of 1-2 Hz/s, an energy exchange can occur during the transitions, this exchange being due to the filtering action carried out on the measurement of the active power $P_m$.

Figure 4:
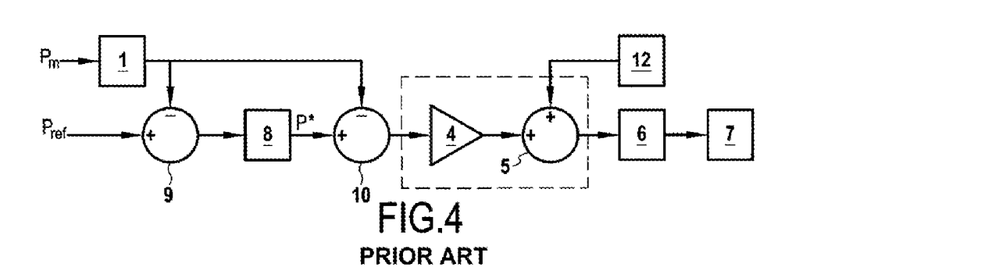
FIG. 4, already described, schematically shows a droop loop modified using a phase-locked loop.

A solution to mitigate this problem is illustrated in FIG. 4. In this solution, the frequency setpoint $f_0$ of the droop equation in the standard regulation loop 3 is replaced by the main network frequencies measured via a rapid phase-locked loop 12 (PLL). In such a case, the term droop $k_f(P^*-P_m)$ is no longer used to follow the output frequency but just to control the phase between the voltage sources and the exchanged power.

Other solutions known in the state of the art are also described in documents EP 3 485 386, WO 2016/133843, EP 2 731223, CN 107 294 201 and CN 105 743 130.

OBJECT AND SUMMARY OF THE INVENTION

The purpose of the invention is to provide a system and a method providing a stable operating point for the generating set during the transient load variation minimizing the frequency and voltage variation in the microgrid.

In a first object of the invention, a method for regulating a converter, such as a power control system, is proposed for autonomously stabilizing the frequency in a microgrid to which the converter is intended to be connected, the microgrid comprising a generating set. The method comprises at least two iterations of the following steps:

a reception of an initial power setpoint of the converter and an estimate of an active power of the converter, a determination of a first power variation at least from the difference between the initial power setpoint and the estimated active power, a determination of a power regulation variable from the first power variation, a calculation of a second power variation at least from the difference between the power regulation variable and the estimated active power, and a determination of a frequency command for commanding the converter from the second power variation, According to a general characteristic of the regulation method, the method further comprises an active damping step comprising the following steps:

a reception of a frequency value characteristic of a load variation of said microgrid to which the converter is intended to be connected, and a determination of an active damping value on the basis of said frequency value received in step f), the first power variation determined in step b) resulting from the initial power setpoint from which the estimated active power and the active damping value have been subtracted.

The nominal frequency of the converter, with a slight delay, corresponds to the frequency of the output network. Consequently, any change in this frequency can be detected by looking at the term according to the second power variation, that is to say the term k(P*-P$_m$) determined from the difference between the power regulation variable and the estimated active power, k being a coefficient.

The method according to the invention achieves complete transient management in a simpler, faster and sensorless manner, constantly improving the time response and reducing the complexity of the system.

Indeed, in a generating set, a difference between the mechanical torque of the motor and the electrical torque of the alternator causes a change in the frequency which is measured by the frequency variator which accelerates or decelerates the motor to correspond to the electrical torque: the increase in the active output power forces an increase in the electric torque and consequently a drop in frequency, and vice versa.

Thus, the method according to the invention uses the measurement of the frequency of the network as an indirect means for measuring a load variation, based on the characteristic of the generating set, and uses it to modify the active nominal power of the converter to catch the load and avoid a change in the operating point of the generating set.

In this way, the load variation is mainly perceived by the converter which can react quickly and reduce the effect of load variation on the generating set: with a less load variation, the frequency of the generating set is less affected and so is its operating point.

The method according to the invention allows automatically reducing the load transients perceived by the generating set and consequently optimizing its fuel consumption and stabilizing the frequency of the microgrid even in transient mode. No external sensor, no dedicated logic, and no broadband communication bus are necessary because the converter dynamically updates its active power reference by following the load variations of the microgrid.

Compared to a peak reduction technique based on measurements, the invention avoids direct measurement of the active power of the microgrid. In known prior solutions, this measurement is generally carried out either by independent measurement systems, or by the converter itself using external sensors.

The invention can also be applied to the command of renewable energy inverters (usually operating on current) to ensure additional stabilization of the network: in a microgrid application, the renewable energy sources do not generally operate at maximum operating point but are limited to the power balance between the charge and the state of charge of the batteries so that additional power is often available. The converter can automatically act as a frequency/voltage stabilizer during network transients by maintaining the desired setpoint in steady state.

In a first embodiment of the regulation method, the determination of the frequency command in step e) comprises a determination of a frequency variation from the second power variation, and the addition of a nominal frequency of the converter to the frequency variation, the frequency value received in step f) corresponding to said frequency variation determined from the second power variation.

In this first embodiment, the term k(P*-P$_m$) is used to detect frequency variations. If there is a positive variation, it means that the frequency of the generator increases, which means, according to the equations of the generating set, that the load of the microgrid decreases, therefore the active damping acts as a proportional regulator based on the term k(P*-P$_m$) decreases the initial power setpoint of the converter by reducing its active output power to compensate for the decrease in load and reduce the load variation seen by the generating set.

In this first embodiment, the frequency variations are detected with an intrinsic delay because the term k(P*-P$_m$) depends on the active power measurement P$_m$ which results from an internal filtering action.

In a second embodiment of the regulation method, the method comprises measuring the network frequency of the microgrid with a phase-locked loop (PLL), and calculating a first frequency variation from the difference between said measurement of the network frequency and a nominal frequency of the converter, the frequency value received in step f) corresponding to said first frequency variation, the second power variation calculated in step d) resulting from subtracting the estimated active power and the active damping value from the power regulation variable, the determination of the frequency command in step e) comprising a determination of a second frequency variation from the second power variation, and the measured network frequency being added to the second frequency variation to determine the frequency command in step e).

In this second embodiment, firstly, the PLL loop is much faster to follow the frequency variations of the generating set, so that the load variation is seen earlier, reducing the load transitions of the generating set.

Secondly, in the case where the active damping requires a power difference exceeding a defined threshold (linked for example to the nominal power of the converter or to the state of charge of the battery), it is saturated: in this case, the active damping characteristic is frozen, and the PLL loop is used to quickly follow the frequency variations of the generating set in order to better control the output power of the converter and avoid exceeding the defined power threshold.

To better understand the PLL solution, it is useful to write the frequency of the converter:

$$\omega_{inv} = 2\pi f_{PLL} + 2\pi k_P(P^* - P_m - P_{damping}) \text{ or}$$

$$\omega_{inv} = 2\pi f_{PLL} + 2\pi k_P(P^* - P_m - k_D(2\pi f_{PLL} - \omega_0)) \text{ or}$$

$$\omega_{inv} = 2\pi k_P k_D \omega_0 + 2\pi f_{PLL}(1 - 2\pi k_P k_D) + 2\pi k_P(P^* - P_m)$$

with $\omega_{inv}$ the angular frequency of the inverter, $P_{damping}$ the active damping value, and $k_D$ the damping coefficient to determine the active damping value from the determined frequency variation.

From the equation written above, it is clear that the last term is the standard "modified" droop term, or "droop term", already described while if the damping factor is selected as $$k_D = \frac{1}{2\pi k_P}$$

the equation is simplified compared to that corresponding to the diagram of FIG. 4.

The regulation method can also be used in the case of a controller configuration in current mode, such as auxiliary storage solutions. In this case, the PLL, used to synchronize the reference of the current controller with the output voltage, is also used to measure the voltage difference compared to its nominal setpoint or a high filtered value of the output frequency: the error is used to perform the proposed algorithm acting on the active nominal power of the inverter.

In a second object of the invention, a system for regulating a converter adapted to autonomously stabilize the frequency in a microgrid to which the converter is intended to be connected, is proposed, the microgrid comprising a generator. The regulation system comprises:
a first module receiving an initial power setpoint of the converter and an estimate of an active power of the converter,
an external regulator block connected to the output of the first module and supplying a power regulation variable,
a second module configured to calculate a second power variation by subtracting the estimated active power of the converter from the power regulation variable, and
a droop block, or "basic droop block", configured to calculate a frequency variation based on the second power variation and provide a frequency command value for commanding the converter from the second power variation, According to a general characteristic of the regulation system, the regulation system further comprises an active damping block configured for:
receiving on an input a frequency value characteristic of a load variation of said microgrid to which the converter is intended to be connected, and
supplying to the first module an active damping value determined from the frequency value received as input, the first module being configured to supply a first power variation resulting from the subtraction of the measured active power and the active damping value from the initial reference power.

In a first embodiment of the regulation system, the droop block comprises a module configured to calculate a frequency variation from the second power variation and an adder configured to calculate the frequency command by adding a nominal frequency of the converter to said frequency variation, the droop block supplying the frequency variation determined by said module directly on said input of the active damping block.

In a second embodiment of the regulation system, the system may further comprise a phase-locked loop configured to measure the network frequency of the microgrid, and a third module configured to calculate a difference between said network frequency and a nominal frequency of the converter, the third module supplying the difference calculated on said input of the active damping block, and the phase-locked loop supplying the droop block with the measured network frequency, the droop block comprising a module configured to calculate a frequency variation from the second power variation and an adder configured to add the measured network frequency to the frequency variation determined by said module to determine the frequency command.

BRIEF DESCRIPTION OF THE DRAWINGS

The invention will be better understood upon the following reading, made in an indicative and non-limiting manner, with reference to the appended drawings in which.

DETAILED DESCRIPTION OF EMBODIMENTS

The present invention will be described in relation to particular embodiments and with reference to some figures, but the invention is not limited thereto but only by the claims. The described figures are only schematic and are not limiting. In the figures, the size of some of the elements can be exaggerated and not drawn to scale for illustration purposes. When the term "comprising" is used in the present description and the claims, it does not exclude other elements or steps. When an undefined or defined article is used to designate a singular name, for example "a", "the", this includes a plural of that name unless something else is specifically specified.

The term "comprising", used in the claims, should not be interpreted as being limited to the means listed below; it does not exclude other elements or steps. Thus, the scope of the expression "a device comprising means A and B" should not be limited to the devices consisting only of components A and B. This means that, relative to the present invention, the only relevant components of the device are A and B.

In addition, the terms first, second, third and the like in the description and in the claims are used to distinguish between similar elements and not necessarily to describe a sequential or chronological order. It should be understood that the terms thus used are interchangeable under appropriate circumstances and that the embodiments of the invention described here are capable of operating in sequences other than those described or illustrated herein.

Figure 5:
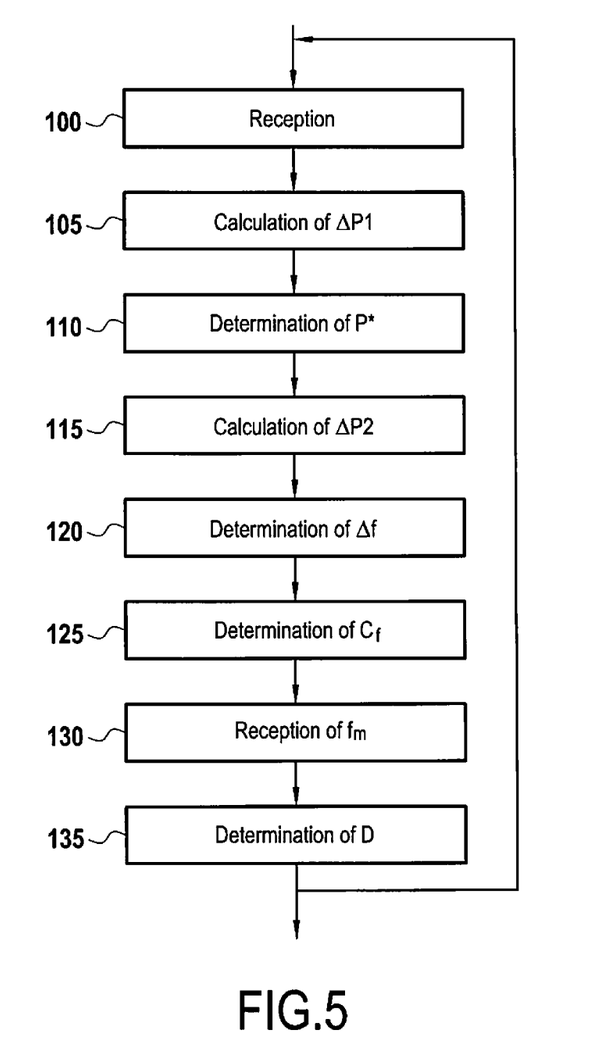
FIG. 5 shows a flowchart of a regulation method according to a first embodiment of the invention.

FIG. 5 schematically shows a flowchart of a first embodiment of a method for regulating a converter, such as a power control system, for autonomously stabilizing the frequency in a microgrid to which the converter is intended to be connected, the microgrid comprising a generating set.

In this first embodiment of the regulation method, the method comprises a first step 100 of receiving an initial power setpoint $P_{ref}$ of the converter and an estimate of an active power $P_m$ of the converter.

In a second step 105 of the regulation method, a first power variation ΔP1 is determined by calculating the difference between the initial power setpoint $P_{ref}$ and the estimated active power $P_m$.

In a third step 110 of the regulation method, a power regulation variable P* is determined from the first power variation ΔP1.

In a fourth step 115 of the regulation method, a second power variation ΔP2 is calculated from the difference between the power regulation variable P* and the estimated active power $P_m$.

In a fifth step 120 of the regulation method, a frequency variation Δf is determined from the second power variation ΔP2.

In a sixth step 125 of the regulation method, a frequency command $C_f$ for commanding the converter is determined from the determined frequency variation Δf.

In a seventh step 130 of the regulation method, an active damping block receives the determined frequency variation Δf as input frequency value $f_{in}$.

And in an eighth step 135 of the regulation method, an active damping value D is determined from the input frequency value $f_{in}$.

After this eighth step 135, the regulation method is reiterated. During the following iteration of the regulation method:
- the first power variation ΔP1 determined in the second step 105 is calculated by subtracting the estimated active power $P_m$ and the active damping value D from the initial power setpoint $P_{ref}$;
- the frequency command $C_f$ is determined in the sixth step 125 by adding a nominal frequency $f_0$ of the converter to the frequency variation Δf; and
- the input frequency value received by the active damping block is transmitted directly from a block determining said frequency variation Δf from the second power variation ΔP2, this latter block supplying the frequency variation Δf to the adder determining the frequency command $C_f$ in step 125.

Figure 6:
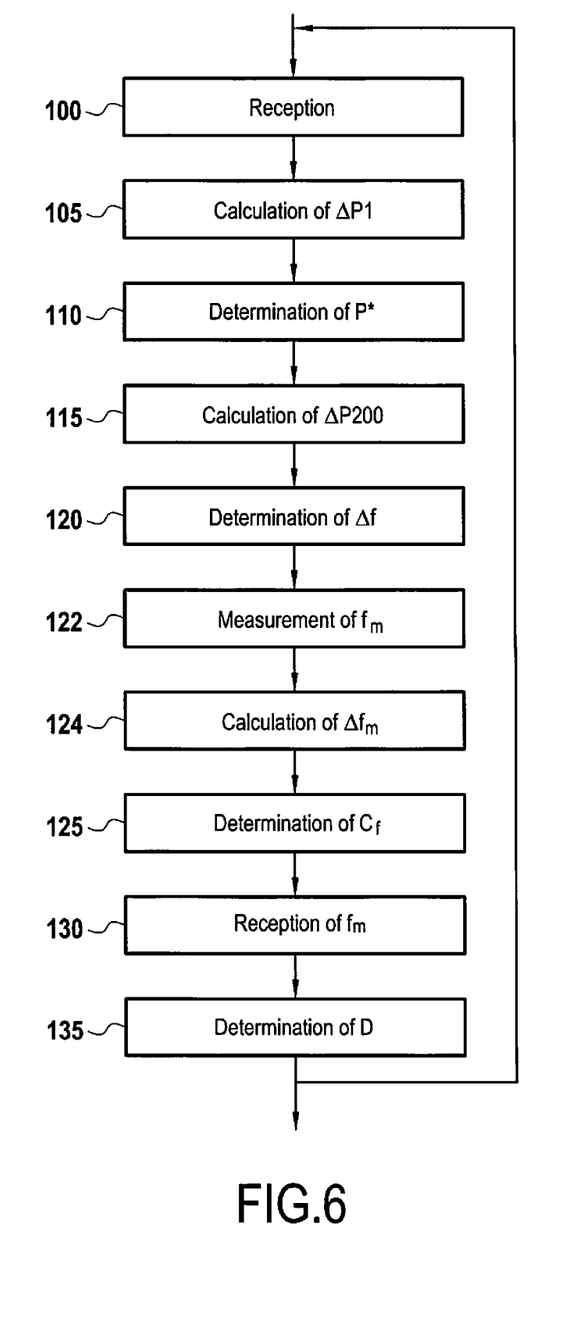
FIG. 6 shows a flowchart of a regulation method according to a second embodiment of the invention.

FIG. 6 shows a flowchart of a second embodiment of a method for regulating a converter, such as a power control system, for autonomously stabilizing the frequency in a microgrid to which the converter is intended to be connected, the microgrid comprising a generating set.

The steps of the second embodiment of the regulation method illustrated in FIG. 6 identical to the steps of the first embodiment of the regulation method illustrated in FIG. 5 bear the same reference numerals.

The second embodiment of the regulation method illustrated in FIG. 6 differs from the first embodiment of the regulation method illustrated in FIG. 5 in that:
- it comprises a first additional step 122 in which the network frequency of the microgrid $f_m$ is measured with a phase-locked loop,
- it also comprises a second additional step 124 in which a difference $\Delta f_m$ between said measurement of the network frequency $f_m$ and a nominal frequency $f_0$ of the converter, is calculated,
- the measured network frequency $f_m$ is added to the determined frequency variation $\Delta f_m$ to determine the frequency command $C_f$ in the sixth step 125,
- the difference calculated in the second additional step 124 being used as the input frequency value received in the seventh step 130, and
- the second power variation ΔP200 calculated in the fourth step 115 results from the power regulation variable P* from which the estimated active power $P_m$ and the active damping value D have been subtracted.

Figure 7:
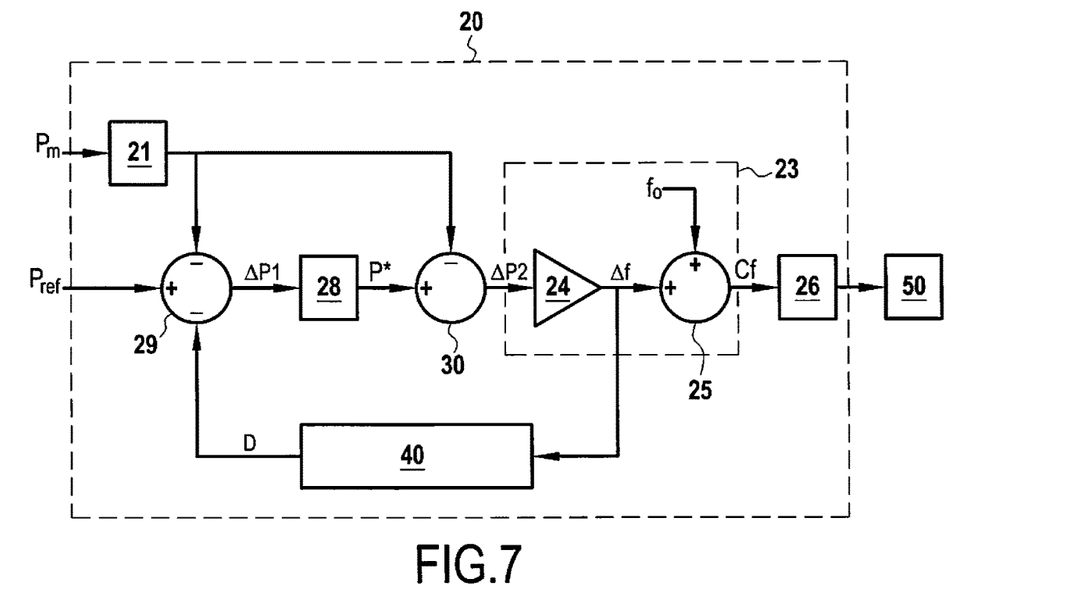
FIG. 7 schematically illustrates a regulation system according to a first embodiment of the invention.

FIG. 7 schematically illustrates a regulation system 20 of an electrical converter 50, such as a power conversion system (PCS), according to a first embodiment of the invention. The regulation system is adapted to autonomously stabilize the frequency in a microgrid to which the converter is intended to be connected, the microgrid comprising a generating set. The first embodiment of the regulation system 20 is configured to perform the first embodiment of the regulation method illustrated in FIG. 5.

In this first embodiment of the regulation system, the system 20 comprises a first module 29 receiving an initial power setpoint $P_{ref}$ of the PCS 50, a measurement of an active power $P_m$ of the PCS 50 filtered by a low-pass filter 21, and an active damping value D of an active damping block 40. The first module 29 calculates a first power variation ΔP1 by subtracting the values of the filtered active measured power $P_m$ and the active damping value D from the initial power setpoint $P_{ref}$.

The system 20 further comprises an external regulator block 28 coupled to the output of the first module 21. The external regulator block 28 determines a power regulation variable P* from the first power variation ΔP1 by applying an integral correction to the first power variation ΔP1.

The system 20 also comprises a second module 30 receiving the power regulation variable P* and the filtered active measured power $P_m$ of the PCS 50. The second module 30 is configured to calculate a second power variation ΔP2 by calculating the difference between the power regulation variable P* and the filtered active measured power $P_m$.

The system 20 comprises a droop block 23, or "basic droop block", which comprises an operator 24 configured to calculate a frequency variation Δf from the second power variation ΔP2 and an adder 25 configured to determine a frequency command $C_f$ for commanding the PCS 50 from the result of the addition between the frequency variation Δf and the nominal frequency $f_0$. The droop block 23 supplies the frequency command $C_f$ to an integrator 26, the frequency command $C_f$ corresponding to the sinusoidal voltage reference angle of the inverter θ.

The active damping block 40 receives as an input frequency value the frequency variation Δf calculated by the operator 24 of the droop block 23. As already explained above, the active damping block 40 is configured to determine an active damping value D from a proportional correction of the input frequency and to supply the active damping value D to the first module 29. As previously explained, a variation in load causes a variation in frequency of the generating set due to the intrinsic characteristics of the generating set: the damping block 40 tries to reconstruct the load variation from the PCS frequency variation in order to modify the PCS setpoint according to the load and to minimize the load variation seen by the generating set.

Figure 8:
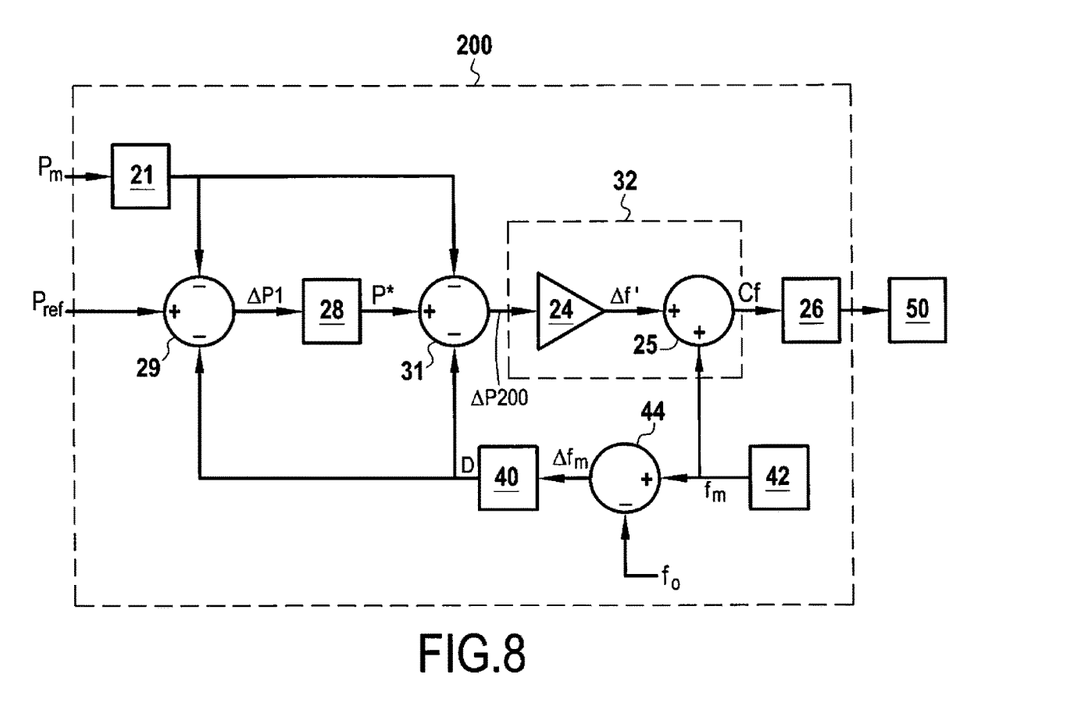
FIG. 8 schematically illustrates a regulation system according to a second embodiment of the invention.

FIG. 8 schematically illustrates a regulation system 200 of an electrical converter 50, such as a PCS, according to a second embodiment of the invention. The regulation system is adapted to autonomously stabilize the frequency in a microgrid to which the converter is intended to be connected, the microgrid comprising a generating set. The second embodiment of the regulation system 200 is configured to carry out the second embodiment of the regulation method illustrated in FIG. 6.

The elements of the second embodiment of the regulation system 200 identical to the elements of the first embodiment of the regulation system 20 have the same reference numerals.

The second embodiment of the regulation system 200 illustrated in FIG. 8 differs from the first embodiment of the regulation system 20 illustrated in FIG. 7 in that the second module 30 of the first embodiment is replaced by a first module 31 receiving not only the power regulation variable P* and the filtered active measured power $P_m$ of the PCS 50, but also the active damping value D. The first module 31 is configured to calculate a second power variation ΔP200 by subtracting the filtered active measured power $P_m$ and the active damping value D from the power regulation variable P* determined by the external regulator block 28.

The second embodiment of the regulation system 200 also differs from the first embodiment 20 in that it comprises a phase-locked loop system 42 (PLL) configured to measure the network frequency of the microgrid $f_m$, and a third module 44 configured to calculate the difference $\Delta f_m$ between the measured network frequency $f_m$ and a nominal frequency $f_0$ of the PCS 50. The active damping block 40 receives as input the difference $\Delta f_m$ calculated by the third module 44.

The second embodiment of the regulation system 200 also differs from the first embodiment 20 in that the adder 25 of the droop block 23 receives the network frequency of the microgrid $f_m$ measured instead of a nominal frequency $f_0$ and a frequency variation Δf which is determined from the second power variation ΔP200, then calculates the frequency command $C_f$ by adding the measured network frequency $f_m$ to the determined frequency variation Δf.

The regulation method and the regulation system according to the invention allow managing the discontinuous availability of renewable resources or the variation of the loads as well as optimizing the operating point of the generating set (fuel economy). It also provides redundancy in order to have a fail-safe system operation without any single point of failure.

In addition, the invention provides autonomous operation capability, facilitates the transition from transient autonomous operation, and provides a frequency control during the load transient.

Furthermore, the invention allows operating the energy management system by setting up only the operating point in steady state, with a slow communication network. With the invention, there is no constraint on the position in the microgrid and the distance between the PCS, the generating set and the energy management system (EMS).

The invention may also be applied to the control of renewable energy inverters (usually operating as current generators) to ensure additional stabilization of the network.

The invention claimed is:

1. A method for regulating a converter, such as a power control system, for autonomously stabilizing the frequency in a microgrid to which the converter is intended to be connected, the microgrid comprising a generating set, the method comprising at least two iterations of the following steps:
   a) a reception of an initial power setpoint of the converter and an estimate of an active power of the converter,
   b) a determination of a first power variation at least from the difference between the initial power setpoint and the estimated active power,
   c) a determination of a power regulation variable from the first power variation,
   d) a calculation of a second power variation at least from the difference between the power regulation variable and the estimated active power, and
   e) a determination of a frequency command for commanding the converter from the second power variation,
   wherein the method further comprises an active damping step comprising the following steps:
   f) a reception of a frequency value characteristic of a load variation of said microgrid to which the converter is intended to be connected, and
   g) a determination of an active damping value from the frequency value received in step f),
   the first power variation determined in step b) resulting from the initial power setpoint from which the estimated active power and the active damping value have been subtracted.

2. The method according to claim 1, wherein the determination of the frequency command in step e) comprises a determination of a frequency variation from the second power variation, and the addition of a nominal frequency of the converter to the frequency variation, the frequency value received in step f) corresponding to said frequency variation determined from the second power variation.

3. The method according to claim 1, further comprises measuring the network frequency of the microgrid with a phase-locked loop, and calculating a first frequency variation from the difference between said measurement of the network frequency and a nominal frequency of the converter, the frequency value received in step f) corresponding to said first frequency variation, the second power variation calculated in step d) resulting from subtracting the estimated active power and the active damping value from the power regulation variable, the determination of the frequency command in step e) comprising a determination of a second frequency variation from the second power variation, and the measured network frequency being added to the second frequency variation to determine the frequency command in step e).

4. A regulation system of a converter adapted to autonomously stabilize the frequency in a microgrid to which the converter is intended to be connected, the microgrid comprising a generating set, the regulation system comprising:
   a first module receiving an initial power setpoint of the converter and an estimate of an active power of the converter,
   an external regulator block coupled to the output of the first module and supplying a power regulation variable,
   a second module configured to calculate a second power variation by subtracting the estimated active power of the converter from the power regulation variable, and
   a droop block configured to determine a frequency command for commanding the converter from the second power variation,
   wherein the regulation system further comprises an active damping block configured for:
   receiving on an input a frequency value characteristic of a load variation of said microgrid to which the converter is intended to be connected, and
   supplying to the first module an active damping value determined from the frequency value received at the input,
   the first module being configured to supply a first power variation resulting from the subtraction of the measured active power and the active damping value from the initial power setpoint.

5. The regulation system according to claim 4, wherein the droop block comprises a module configured to calculate a frequency variation from the second power variation and an adder configured to calculate the frequency command by adding a nominal frequency of the converter to said frequency variation, the droop block supplying the frequency variation determined by said module directly on said input of the active damping block.

6. The regulation system according to claim 4, further comprising a phase-locked loop configured to measure the network frequency of the microgrid, and a third module configured to calculate a difference between said network frequency and a nominal frequency of the converter, the third module supplying the difference calculated on said input of the active damping block, and the phase-locked loop supplying the droop block with the measured network frequency, the droop block comprising a module configured to calculate a frequency variation from the second power variation and an adder configured to add the measured network frequency to the frequency variation determined by said module to determine the frequency command.

* * * * *